(12) United States Patent
Beaty et al.

(10) Patent No.: US 8,495,584 B2
(45) Date of Patent: Jul. 23, 2013

(54) AUTOMATED DESKTOP BENCHMARKING

(75) Inventors: Kirk A. Beaty, Goldens Bridge, NY (US); Andrzej Kochut, Elmsford, NY (US); Junghwan Rhee, West Lafayette, IN (US)

(73) Assignee: International Business Machines Corporation, Armonk, NY (US)

( * ) Notice: Subject to any disclaimer, the term of this patent is extended or adjusted under 35 U.S.C. 154(b) by 653 days.

(21) Appl. No.: 12/721,141

(22) Filed: Mar. 10, 2010

(65) Prior Publication Data
US 2011/0225569 A1 Sep. 15, 2011

(51) Int. Cl.
G06F 9/44 (2006.01)
G06F 15/173 (2006.01)
G06F 3/048 (2006.01)

(52) U.S. Cl.
USPC ........... 717/127; 717/128; 717/129; 717/130; 709/224; 715/764

(58) Field of Classification Search
None
See application file for complete search history.

(56) References Cited

U.S. PATENT DOCUMENTS

| 6,873,934 | B1 | | 3/2005 | Rodrigues et al. | |
|---|---|---|---|---|---|
| 7,099,893 | B2 | | 8/2006 | Bischof et al. | |
| 7,412,371 | B2 | * | 8/2008 | Fisher et al. | 703/17 |
| 7,506,318 | B1 | * | 3/2009 | Lindo et al. | 717/130 |
| 7,958,497 | B1 | * | 6/2011 | Lindo et al. | 717/128 |
| 8,079,019 | B2 | * | 12/2011 | Lindo et al. | 717/129 |
| 8,321,842 | B2 | * | 11/2012 | Xu et al. | 717/127 |
| 2002/0026631 | A1 | * | 2/2002 | Barritz | 717/127 |
| 2002/0194329 | A1 | | 12/2002 | Alling | |
| 2003/0001854 | A1 | | 1/2003 | Jade et al. | |
| 2004/0015862 | A1 | * | 1/2004 | Dunn | 717/124 |
| 2004/0111727 | A1 | * | 6/2004 | Schwarzbauer et al. | 719/310 |
| 2004/0261026 | A1 | | 12/2004 | Corson | |
| 2005/0021289 | A1 | * | 1/2005 | Robertson et al. | 702/182 |
| 2005/0065766 | A1 | * | 3/2005 | Creamer et al. | 703/21 |
| 2005/0138104 | A1 | * | 6/2005 | Houh et al. | 709/200 |
| 2005/0278728 | A1 | | 12/2005 | Klementiev | |
| 2006/0217989 | A1 | | 9/2006 | Smith et al. | |
| 2006/0230317 | A1 | | 10/2006 | Anderson | |
| 2007/0112639 | A1 | * | 5/2007 | Blumenau | 705/26 |
| 2008/0005685 | A1 | * | 1/2008 | Drews et al. | 715/764 |
| 2008/0082629 | A1 | | 4/2008 | Puthiyaveettil | |
| 2008/0091466 | A1 | | 4/2008 | Butler et al. | |

(Continued)

OTHER PUBLICATIONS

Junghwan Rhee et al., "DeskBench: Flexible Virtual Desktop Benchmarking Toolkit", [Online], Jun. 2009, pp. 1-8, [Retrieved from Internet on Sep. 23, 2012], <http://www.cs.purdue.edu/homes/rhee/pubs/im09_deskbench.pdf>.*

(Continued)

Primary Examiner — Thuy Dao
Assistant Examiner — Ziaul A Chowdhury
(74) Attorney, Agent, or Firm — Anne V. Dougherty; Ryan, Mason & Lewis, LLP

(57) ABSTRACT

A plurality of user interactions in a baseline computing system are intercepted and recorded, in an artifact file, with a benchmarking tool. The recorded user interactions from the artifact file are replayed and injected to a software stack of a system under test (whose performance is to be compared to the baseline system), using the benchmarking tool. During the replay, screen updates in the system under test are sequentially compared with expected screen images from the artifact file, until a match is observed in a given case. A response time associated with each of the matches is recorded.

23 Claims, 10 Drawing Sheets

U.S. PATENT DOCUMENTS

| | | | | |
|---|---|---|---|---|
| 2008/0186276 | A1* | 8/2008 | Mayer-Ullmann | 345/158 |
| 2009/0112565 | A1* | 4/2009 | Creamer et al. | 703/21 |
| 2009/0265716 | A1* | 10/2009 | Prashanth | 719/312 |
| 2009/0320011 | A1* | 12/2009 | Chow et al. | 717/154 |

OTHER PUBLICATIONS

Jason Nieh et al., "Measuring Thin-Client Performance Using Slow-Motion Benchmarking", [Online], Feb. 2003, pp. 87-115, [Retrieved from Internet on Sep. 26, 2012], <http://delivery.acm.org/10.1145/600000/592640/p87-nieh.pdf>.*

Daniel Schlosser et al., "Performance Comparison of Windows-based Thin-Client Architectures", [Online], Dec. 2007, pp. 197-202, [Retrieved from Internet on Sep. 26, 2012], <http://ieeexplore.ieee.org/stamp/stamp.jsp?tp=&arnumber=4665260>.*

Albert M Lai et al., "On the Performance of Wide-Area Thin-Client Computing", [Online], May 2006, pp. 175-209, [Retrieved from Internet on Sep. 26, 2012], <http://delivery.acm.org/10.1145/1140000/1132029/p175-lai.pdf>.*

Jason Nieh et al., "A Comparison of Thin-Client Computing Architectures", [Online], Nov. 2000, pp. 1-16, [Retrived from Internet on Mar. 21, 2013], <http://academiccommons.columbia.edu/download/fedora_content/download/ac:110382/CONTENT/cucs-022-00.pdf>.*

Konstantinos A. Gotsis et al., "A Test Lab for the Performance Analysis of TCP Over Ethernet LAN on Windows Operating System", [Online], IEEE May 2005, pp. 318-328, [Retrieved from Internet on Mar. 21, 2013], <http://ieeexplore.ieee.org/stamp/stamp.jsp?tp=&arnumber=1427883>.*

Mauro Andreolini et al., "Benchmarking Models and Tools for Distributed Web-Server Systems", [Online], 2002, pp. 208-235, [Retrieved from Internet on Mar. 21, 2013], <http://download.springer.com/static/pdf/439/chp%253A10.pdf>.*

Dr. Mark T. Maybury, "Putting Usable Intelligence into Multimedia Applications", [Online], IEEE 1999, pp. 107-110, [Retrieved from Internet on Mar. 21, 2013], <http://ieeexplore.ieee.org/stamp/stamp.jsp?tp=&arnumber=779129>.*

Nieh et al., Measuring Thin-Client Performance Using Slow-Motion Benchmarking, ACM Transactions on Computer Systems, vol. 21, No. 1, Feb. 2003, pp. 87-115.

Laadan et al., DejaView: A Personal Virtual Computer Recorder, SOSP'07, Oct. 14-17, 2007, Stevenson, Washington, USA, pp. 279-292.

Zeldovich et al., Interactive Performance Measurement with VNCplay, USENIX Association, FREENIX Track: 2005 USENIX Annual Technical Conference, pp. 189-198.

IBM Press Room—Jun. 23, 2005 IBM Acquires Meiosys—United States, http://www-03.ibm.com/press/us/en/pressrelease/7755.wss.

Ernst, Virtual Strategy Magazine, Meiosys: Application Virtualization and Stateful Application Relocation, Mar. 2, 2005, pp. 1-4.

Brown et al., A Decompositional Approach to Computer System Performance Evaluation, Apr. 1997, pp. 1-77.

Kernel Virtual Machine, http://sourceforge.net/projects/kvm/, Jul. 2010.

Rdesktop: A Remote Desktop Protocol Client, http://www.rdesktop.org/, Jul. 2010.

Citrix Systems, Virtualization, Networking and Cloud. Virtual Computer, Simplified. http://www.citrix.com/lang/English/home.asp, Jul. 2010.

Remote Desktop Protocol, http://msdn.microsoft.com/en-us/library/aa383015(Vs.85,printer).aspx, Jul. 2010.

Microsoft Corporation, http://www.microsoft.com/en/us/default.aspx, Jul. 2010.

TPC, Homepage, http://www.tpc.org/, Jul. 2010.

VMware Positioned in the Leaders Quadrant, http://www.vwware.com/, Jul. 2010.

Linux Advanced Routing & Traffic Control HOWTO, http://lartc.org/, Jul. 2010.

Realvnc—VNC® Remote Control Software, http://www.realvnc.com, Jul. 2010.

Citrix Systems >> Citrix XenServer: Efficient Server Virtualization Software, http://www.citrix.com/English/ps2/products/product.asp?contentID=683148, Jul. 2010.

AutoIt v3—Automate and Script Windows Tasks—for Free! http://www.autoitscript.com/autoit3/index.shtml, Aug. 2010.

Print Head >> RFB Play Macro, http://cyberelk.net/tim/software/rbplaymacro/, Aug. 2010.

IBM, Rational Robot, Rational Robot Software, http://www-01.ibm.com/software/awdtools/tester/robot/, Aug. 2010.

Introduction, GNU Xnee, http://www.sandklef.com/xnee/, Aug. 2010.

Khetawat et al,, Internet-based Desktop in Tcl/Tk: Collaborative and Recordable, pp. 1-13, Sep. 1998.

* cited by examiner

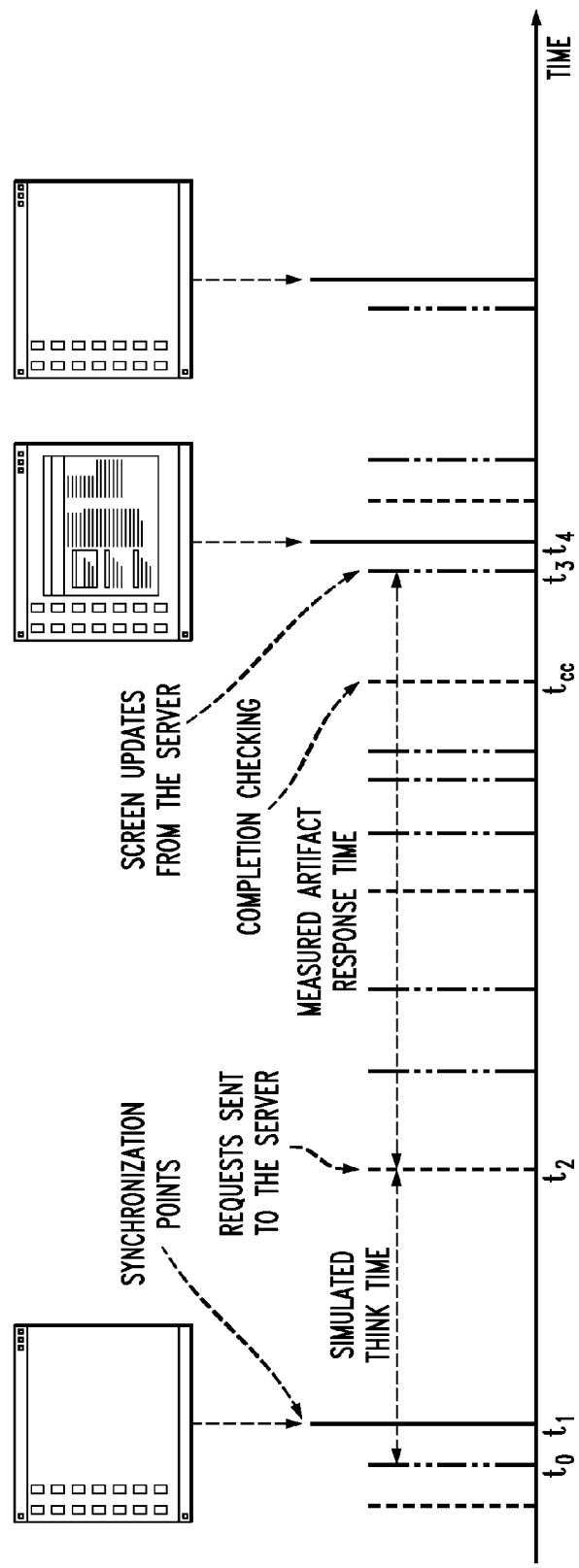

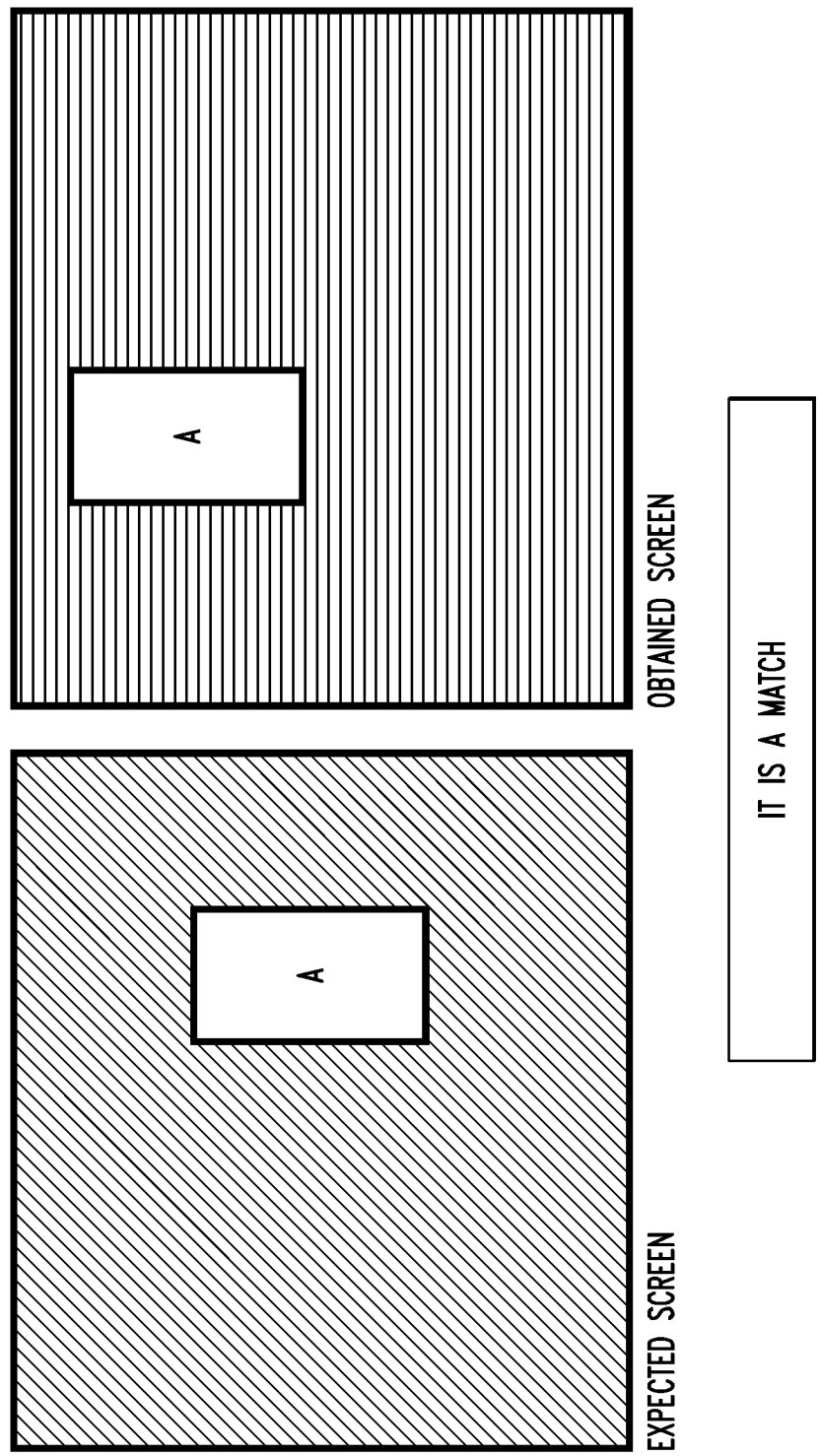

AUTOMATED DESKTOP BENCHMARKING

FIELD OF THE INVENTION

The present invention relates to the electrical and electronic and computer arts, and, more particularly, to computing systems and the like.

BACKGROUND OF THE INVENTION

The way users interact with applications has gone through several phases of development over the last few decades. When computing systems first adopted interactive user input/output devices the users interacted with their applications using text terminals connected to central computers, a good example being the IBM 3270 text terminal. An advent and popularization of personal computers in the early 1980s marked the beginning of desktop computing as known today. In this contemporary model the execution of the operating system and applications happens on the end user device itself. The recent years, however, have witnessed reinvigorated interest in the centralization of end user computing. Technologies such as the Citrix Application Delivery Infrastructure, Microsoft Windows Terminal Services, or most recently virtual machine technology such as Kernel Virtual Machines products, Xen products, or VMWare ESX products are changing the desktop computing landscape back to the model of a terminal connected to a central server.

FIG. 1 illustrates the virtual desktop model. Users access their desktops 106 and applications using "thin client" devices 102 which relay only the keyboard and mouse events and screen updates over the local or wide-area network 108. End-user devices 102 include a monitor, keyboard, mouse, and disk-less "thin client" computer. The execution of the desktop operating system as well as applications takes place on remote servers 104, either within dedicated virtual machines or shared services sessions. This recent transition has been enabled by several developments of underlying technologies. The first one is ubiquitous high-speed networking access that allows effective responsiveness even at significant distances. The throughput of connections is high with fiber-optic cabling for even the "last mile" connections to private homes and small offices. Even though basic propagation latency will remain an obstacle for long distance desktop usage the connections of up to a few hundred miles are sufficiently responsive to allow for a smooth working experience. The second important advancement is the virtualization technology. It decouples users from physical resources thus making the management of the infrastructure much more flexible and arguably more cost-effective. Virtualization can be applied at both the application level and the operating system level The latter makes it possible to run multiple instances of desktop operating system on a single physical server while maintaining full isolation and security.

SUMMARY OF THE INVENTION

Principles of the invention provide techniques for automated desktop benchmarking. In one aspect, an exemplary method includes the step of intercepting and recording, in an artifact file, with a benchmarking tool, a plurality of user interactions in a baseline computing system. An additional step includes replaying and injecting the recorded user interactions from the artifact file to a software stack of a system under test (whose performance is to be compared to the baseline system), using the benchmarking tool. During the replay, an additional step includes sequentially comparing screen updates in the system under test with expected screen images from the artifact file, until a match is observed in a given case. A further step includes recording a response time associated with each of the matches.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed.

One or more embodiments of the invention or elements thereof can be implemented in the form of a computer product including a computer readable storage medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof. can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

One or more embodiments of the invention may offer one or more of the following technical benefits:
  accuracy in benchmarking (including timing and playback, with accurate detection of end conditions)
  repeatability in benchmarking
  greater generality in terms of what can be benchmarked
  One or more of the above advantages may be especially pronounced in embodiments of the invention employing "fuzzy" screen matching as described below.

These and other features, aspects and advantages of the invention will become apparent from the following detailed description of illustrative embodiments thereof, which is to be read in connection with the accompanying drawings.

BRIEF DESCRIPTION OF THE DRAWINGS

FIG. 3 shows an exemplary replay process, according to another aspect of the invention;

FIG. 5 depicts adaptive screen image matching, according to yet another aspect of the invention;

DETAILED DESCRIPTION OF PREFERRED EMBODIMENTS

Figure 1:
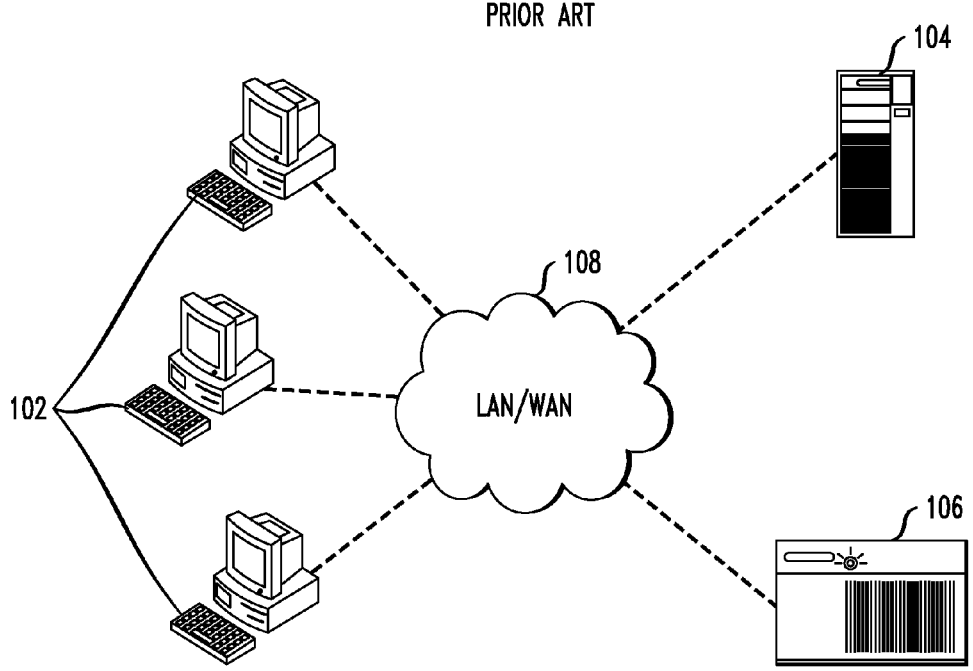
FIG. 1 shows an overview of virtual desktop architecture, in accordance with the prior art.

Desktop virtualization, while offering many advantages, is still a new and emerging technology with many research challenges. One such challenge is the efficient and flexible benchmarking of virtual client systems. This benchmarking is significant for capacity planning of virtual desktop deployments, testing and comparing the performance of hardware and software components, and also for validating and evaluating algorithms and protocols. There are a large number of established benchmarks both for servers and traditional desktops. The prominent example is the suite of database and transaction processing benchmarks defined by Transaction Processing Performance Council. This suite contains a specified set of applications, database schema, data and programs that can be used to exercise the system at its full capacity and at the same time precisely measure transaction throughput and latency.

The thin-client computing model has been recently regaining popularity in a new form known as the virtual desktop, wherein the desktop is hosted on a virtualized platform. Even though the interest in this computing paradigm is broad there are relatively few tools and methods for benchmarking virtual client infrastructures. One or more embodiments of the invention advantageously provide such tools and approaches to enhance success of virtual client deployments and provide objective evaluation of existing and new algorithms, communication protocols, and technologies.

One or more embodiments provide a virtual desktop benchmarking tool, which allows for fast and easy creation of benchmarks by simple recording of the user's activity. One or more instances also allow for replaying the recorded actions in a synchronized manner at maximum possible speeds without compromising the correctness of the replay. The approach relies only on the basic primitives of mouse and keyboard events as well as screen region updates which are common in window manager systems. An experimental prototype of the system and a series of experiments measuring responsiveness of virtual machine based desktops under various load conditions and network latencies are presented herein. The experiments illustrate the flexibility and accuracy of the method and also give some interesting insights into the scalability of virtual machine based desktops.

Developing maturity in testing and performance benchmarking of virtual desktop systems is a much more challenging task than traditional desktop or server benchmarking. There are three main reasons why this is the case.

First, replaying a sequence of user actions at a high speed (which is required to test the systems performance under high load conditions) is difficult. Before replaying the next action in a sequence the benchmarking program has to make sure that the effects of the prior action have been properly reflected so that the state of the system is correct for invocation of the next action. An example of this situation is a benchmark including three actions: opening an editor window, typing a letter in this window, and closing the window. Observe that replaying the action of typing a letter can be initiated only after the window is fully opened. If it is not the case, not only will the measured response time of the action be incorrectly computed but also the benchmark playback can enter an inconsistent state with the keystroke representing the letter being directed to the desktop rather than the editor window.

This situation gets worse when the system operates under high load conditions because the delay between completion of actions can stretch significantly. Yet this is exactly the scenario which it is desirable to benchmark.

Second, virtual workstation performance is considerably more difficult to define than that of a database server, application server, or traditional desktop. This is because the interest is not only in the timing of events, but also in the quality of the display updates that the user perceives. Some remote access protocols, such as VNC, RDP, or ICA, may drop screen updates that do not arrive in time to be played back, thus even though the timing of the action's execution is acceptable, the resulting output quality is not. Similar problems affect the audio quality.

Third, most protocols used by virtual workstations to communicate with the end-user devices are either proprietary or at best open but with very little documentation. Thus engineering a benchmarking system that is applicable to a variety of protocols and applications is a challenge.

One or more embodiments provide a flexible and accurate desktop benchmarking system capable of replaying and timing previously recorded user actions. One or more embodiments use only the basic primitives of keyboard and mouse events and frame buffer region updates to record and time the replay of user actions with arbitrary speed. One or more instances of a tool, in accordance with an aspect of the invention, work in two phases: recording of user actions and replaying them against a test system. The recording of user actions stores the keyboard and mouse events together with inter-arrival time information. Moreover, at important points of the execution which are required to synchronize the replay (such as the moment of opening the editor window in the example described above) the user recording the benchmark can mark the current screen state as a synchronization element. The synchronization element represents the state of the desktop's screen image at that instance. During the replaying phase the keyboard and mouse events are sent to the desktop application. In order to deal with the replay synchronization problem the subsequent mouse and keyboard events are appropriately delayed until the state of the screen reaches the expected synchronization point. The decision whether the screen is in an expected state can be either fully deterministic or "fuzzy" based on image similarity metrics disclosed herein. One or more embodiments have one or more of the following advantages over other approaches described in the literature:

- The recording of user actions is made easy by having the user simply perform the actions he or she would normally do and only marking (with a simple keypress) the synchronization points at instances when the replaying sequence needs to be (potentially) delayed to maintain synchronization.
- Replaying can be done at arbitrary speeds because of the self-synchronizing mechanism being based on actual screen state. Thus the system can be used not only to measure the responsiveness of an almost idle system but also to generate high load. Further, the responsiveness measurements are accurate and account for the total time between the first request and the last screen element update.
- During the recording and replaying of the user actions only basic window system primitives (keyboard, mouse, and screen updates) are used; thus tools according to one or more embodiments can be implemented at the windows manager level with no application-level modifications. This makes one or more embodiments generic and applicable to wide variety of test scenarios.

One or more embodiments allow for general artifacts (e.g., covering the whole screen) as well as providing for "fuzzy" matching making it more robust in adapting to not fully deterministic desktops. Moreover, tools according to one or more embodiments are application- and protocol-indifferent because they can be implemented within the window manager library. Further, one or more embodiments allow replaying the actions at maximum speeds and are not restricted to slow motion. Thus tools according to one or more embodiments can be used to simulate high levels of load using the same actions that are used to time the responsiveness of the system. Moreover, it is easy to create large libraries of user actions, referred to as artifacts, by simply recording user's activity.

Desktop Benchmarking Toolkit

Today there are well accepted benchmarks for producing various types of server workloads. Notably, the Transaction Processing Performance Council (TPC) provides a well established suite of server workload benchmarks, including TPCApp for application server and web services, TPC-C/TPC-E for on-line transaction processing against a database, and TPCH for ad-hoc decision support. TPC defines a set of functional requirements for each benchmark, and then vendors can use proprietary or open systems to implement the benchmark. One or more embodiments provide both the tools which allow for desktop workload benchmarks to be created and driven as well as definition of standardized benchmarks for client workloads such as the definition of the categories of workloads (for example, administrative worker, and application developer).

Approach

Figure 2:
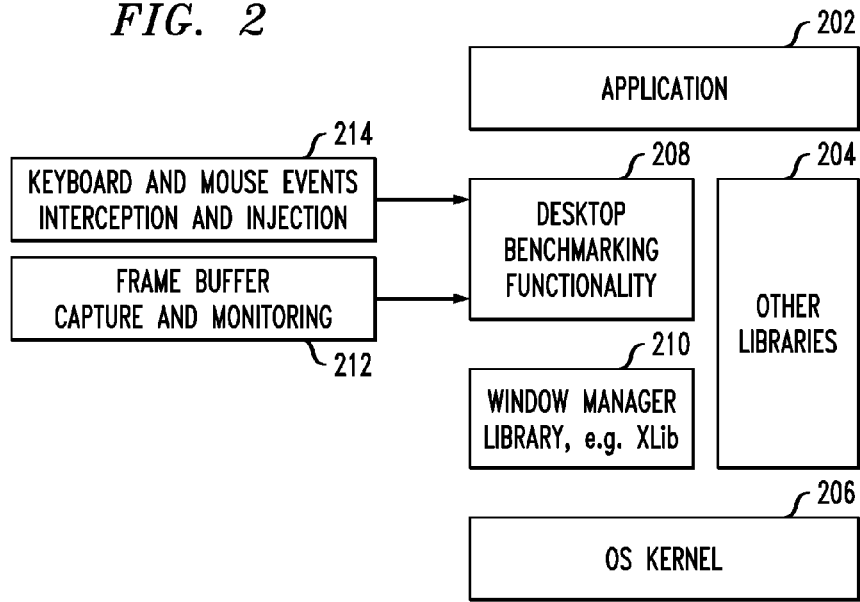
FIG. 2 shows architecture of an exemplary embodiment of a system, according to an aspect of the invention.

One or more embodiments provide recording and playback capability of client user actions, keyboard and mouse events, by intercepting then later injecting the events while monitoring the updates to the application's screen frame buffer to detect event completion. Exemplary architecture of the system and how it integrates within the software stack of the client machine is depicted in FIG. 2. The functionality of the system can be implemented within the window manager software 210 or as an independent layer 208 between the application 202 and the window manager library (as a shim). Other libraries are shown at 204 and the OS kernel at 206. With reference to 212, 214, the primitives that need to be intercepted and injected are common throughout all major window managers, both open source and proprietary. The lightweight software layer intercepts the function calls between the application and window manager library. In the case of the well-known "X Windows" system it is the XLib library, but the same functionality can be implemented for a Microsoft Windows platform by implementing this functionality for its window manager. One or more embodiments operate in one of two modes: recording and replay. Note that unless expressly stated otherwise or apparent from the context, reference to block 208 is intended to include either case described above—an independent layer or functionality within windows manager 210.

Recording phase: During the recording phase all of the keyboard and mouse-click events 214 that are generated by the window manager 210 and passed to the application 202 are recorded. Optionally, the timing of actual user think-times, i.e. the delays between actions, can be also measured and recorded. At each instance that may require enforcing the synchronization of the replay processing the user can denote this in the recorded artifact by pressing a defined key sequence (e.g. prtScr key). An example of such a synchronization point is following a "double-click" event to open a window and/or application, the next action has to be delayed until the screen fully refreshes. In this case the tool user signals the synchronization point after the screen is fully refreshed. This way, during the replay phase, one or more exemplary embodiments will delay the issuing of the next action until the screen reaches the proper state. A synchronization point represents a screen state that is the logical end of a set of events that either is a necessary point to reach before proceeding with subsequent actions, or is a point that the tool user wants to mark for measured execution time. These are used by the play back mechanism to monitor the screen images for completion, after which play back can continue on to the next set of recorded events from the artifact. For each synchronization point, there are one or more hash codes stored with it in the artifact. The hash codes represent an MD5 hash of the screen image buffer that is expected at the completion of the corresponding event element of the artifact being played. By limiting the checking of hash codes to the synchronization points in the artifacts it greatly reduces the CPU needed to process the hashes and thereby the amount of processing needed to monitor the event processing.

Replaying phase: When replaying, one or more embodiments process each event found in the given artifact file in order and inject these into the window manager. Interleaved with event injection is monitoring of the returned screen updates so as to be able to detect event completion at each of the recorded synchronization points. This playback process is depicted in FIG. 3. The horizontal line represents time. Short vertical dashed lines represent requests sent from the client to the desktop running on the server. Short vertical dash-dotted lines represent screen updates arriving from the server. High vertical solid lines represent synchronization points when the observed screen states are compared with the expected one until a match occurs, signaling event completion. Assume that the prior artifact finished at time $t_0$ (which is the time instance of the arrival of the last update associated with that artifact). Periodic screen checking occurs at $t_1$. The procedure used at the synchronization point to determine event completion is to first compare the hash code of the observed screen with those defined in the artifact for the current synchronization point. If there is no match, the "fuzzy" comparison initiates and proceeds as described below. When a match is detected, the system preferably delays the execution for the duration representing the configured user think time (equal to $t_2-t_0$ in FIG. 3).

Observe that some time has already elapsed, due to the lag between the arrival of the last response of the prior artifact and the recognition of the synchronization point ($t_1$). Thus the actual wait time since $t_1$ is the desired think time reduced by $t_1-t_0$. After the think time elapses the next action of the artifact is executed at $t_2$. It is followed by all actions that do not require synchronization as well as responses arriving from the server. After the last event prior to a synchronization point is played, several checks of the screen state can occur but result in a non-match; therefore, the system keeps waiting for the arrival of the proper screen update. Finally, the last required response arrives from the server at $t_3$ and is identified by the system at $t_4$. If the match is found the response time is computed as $t_3-t_2$ and the process repeats for the next artifact. In the event that the system waits too long and no proper screen can be matched (either exactly or via the "fuzzy" matching), one or more embodiments stop replaying and report an out of synchronization exception.

$$\frac{\text{Delta}(A_{Expected}, A_{Obtained})}{\text{Area}(A)} \leq T_{Expected} \quad (1)$$

$$\frac{\text{Area}(B_{Obtained})}{\text{Area}(Screen)} \leq T_{Unexpected}$$

Thus, in FIG. 3, the artifact starts at $t_2$ after the required think time. Throughout the period between $t_2$ and $t_3$ keyboard and mouse requests are sent to the server (vertical dashed lines) and the screen updates arrive from the server (vertical dot-dashed lines). After sending last request (at $t_{cc}$) the system starts checking incoming updates. The final update arrives at $t_3$ and is recognized by the system at $t_4$. At this instance one or more embodiments compute the artifact's response time ($t_3$-$t_2$), and initiate a new think time.

"Fuzzy" matching of screen states: Some embodiments require an exact match of the hash code of the current screen image to that of the hash code stored at the synchronization point of the recorded artifact. This works adequately but requires more controlled environments to run properly. For instance the smallest change of any pixels in the screen image, such as a scroll bar being even a slight bit different in length would cause the driver to not find a match and the playback would be halted. One or more embodiments provide novel methods of "fuzzy" hash code comparisons that have proven beneficial in experimentation by providing the desired improved robustness. Currently preferred embodiments detect small differences in regions outside of the target area as non-essential in making a match, as well as allowing some small percentage of change even within the screen region of interest. This greatly increases the hit ratio for matches while maintaining high accuracy in the proper recognition of event completion. As new screen image hash codes are encountered which are not exact matches, yet considered "fuzzy" matches to those listed for the corresponding synchronization point, they are automatically added to the list of matching hash codes and recorded in the artifact file. This increases the chance for exact matches and thereby increases robustness for future replays of the same artifact.

Figure 4B:
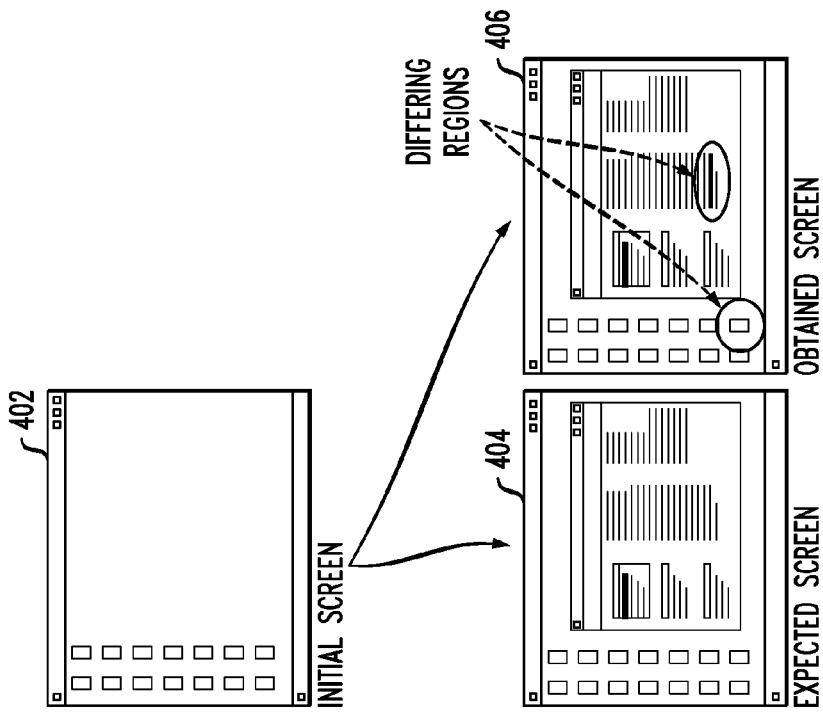
FIGS. 4A and 4B depict exemplary "fuzzy" comparison screens, according to still another aspect of the invention.
Figure 4A:
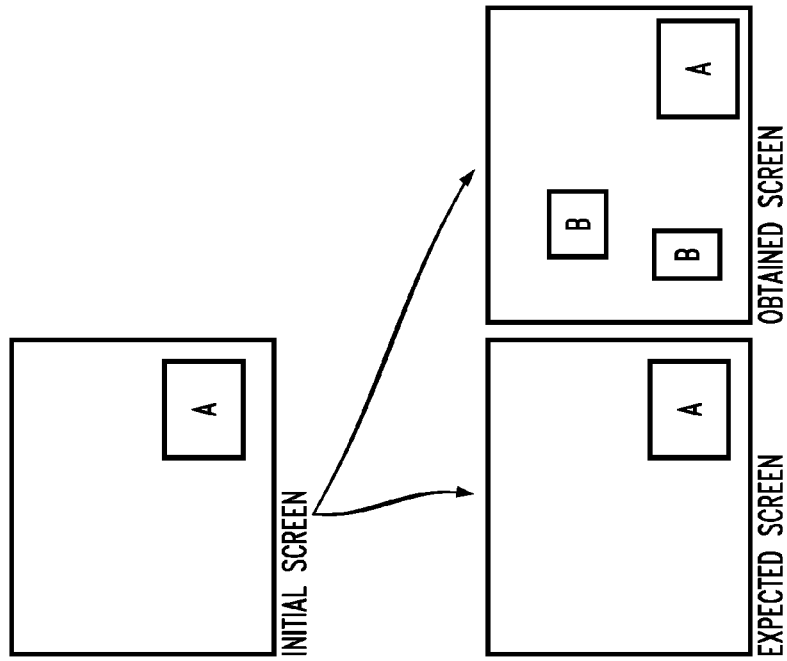

FIG. 4A illustrates this process. The changes expected after execution of an artifact are denoted as A. FIG. 4A shows them as a rectangular area, but of course in general they do not have to be shaped like this (the exemplary technique uses just the number of pixels changed and not the shape of the region). Additional unexpected changes are denoted by B. In such a setting the screens are deemed as matching if both inequalities (1) are true, where $T_{Expected}$ and $T_{unexpected}$ are the thresholds for making the decision and represent a fraction of pixels that is allowed to differ in the expected change region and the fraction of pixels that are allowed to differ in the remaining part of the screen, respectively. Setting the values of these variables is discussed below. Delta(A,B) for corresponding pixel sets A and B is defined as the number of pixels differing in those sets.

An example of this process is depicted in FIG. 4B. The initial screen 402 is a desktop and the expected one 404 after the execution of a synchronized action has a windows explorer window opened and no items highlighted. The screen obtained 406 has the window opened but in addition a file is highlighted and the icon on the desktop was moved. The system detects this fact and evaluates against the thresholds defined with Inequalities (1), determining that the screens differ too much thus aborting further execution.

In embodiments not employing "fuzzy" logic to better detect event completion, small screen differences occasionally get the replay out of synchronization. Even with the "fuzzy" logic, if the differences are large enough, this can still occur. One or more embodiments employ a utility to assist in the detection of what might be only a few pixels difference between what was expected and what was received. As one or more embodiments record, they save screen images for the state of each synchronization point. Thus the utility does a pixel-level comparison of the expected screen image with the screen image of what was received and produces an image of just the areas with differences. This can then be easily viewed to find where to focus in determining what has changed, and what needs to be corrected in the recorded artifact. As stated, if the differences are small, the enhanced "fuzzy" matching will handle these differences automatically.

With reference to FIG. 5, some embodiments employ adaptive screen image matching, wherein tagging box "A" during recording (as an area of interest), shown on the left-hand side, allows flexible playback to different desktops (color and content) and location independence, as shown on the right-hand side.

Optimization of CPU consumption during the replaying process: A significant component of CPU processing is computing the screen hash codes as the screen updates arrive. There are several ways of optimizing this process. One optimization technique limits the completion checking until the last event of a synchronization set is injected (this is the dashed line at $t_{cc}$ in FIG. 3), which greatly reduces the amount of CPU cycles needed to perform the hash code matching necessary.

Another implemented optimization is to compute screen hashes not at each screen update received but at predetermined intervals. The interval can not be too large because that would slow down the initiation of the next artifact; that is, the lag time after the last response arrives from the server (in the example shown in FIG. 3 these lag times are $t_1$-$t_0$ and $t_4$-$t_3$). In an exemplary prototype discussed elsewhere herein, the interval value of 250 ms was employed and was found sufficiently large to result in very low CPU utilization and also responsive enough so the extra delay between artifacts is small.

Another possible optimization is to subdivide the screen into sub-regions and then compute and store hash codes for each of them separately. This way the hash code computation can be done on each arrival of screen updates (because it affects only a small part of the screen).

Measuring the Screen Update Quality

Multiple applications, especially the ones rendering the video frames with high frequency, can finish the processing in time but with poor quality to the user. The reason is that most of the screen updates sent by the application running on the server will get discarded because of the lack of resources (either too slow of a network connection or over-commitment of the server CPU). It is desirable to detect and quantify this deterioration in quality. In order to accomplish this, the measurement of the number of changes of a given screen region can be computed during the replay of a given artifact on a lightly loaded server with very low latency and a high bandwidth network connection to the client. This value constitutes a comparison baseline. Later during the replay of the artifact under normal conditions the number of region refreshes can be compared with that baseline to get an objective measurement. Given the teachings herein, the skilled artisan will be able to adapt known techniques; for example, those described in J. Nieh et al., Measuring Thin-Client Performance Using Slow-Motion benchmarking, in *Proceedings of ACM Transactions on Computer Systems, Vol. 21 No. 1*, February 2003.

Required Preparation for Desktop Benchmarking Tool Execution

A fairly deterministic state of the desktop is desired to be maintained from recording to playback. For instance, to maintain a common desktop with icons arranged in the same order, use roaming profiles for Microsoft Windows clients so that the same user id running on different hosts will appear the same. Further, turn off attributes of the graphical user interface which would cause differences in the screen images; examples include removing the clock from the task bar and turning off the blinking cursor. With the enhancements to use fuzzy matching and support for multiple hash codes many of these non-deterministic aspects of the user desktop can be properly handled without special preparations.

Options for batch testing: One or more embodiments make it easy to create and save recorded artifacts that can then be individually re-played or included in a playlist for automated, scripted playback. Configuration settings allow for artifacts named in playlists to be run in random or deterministic order, to be run once or repetitively, and to have user think-time delays included between execution of the elements of the artifacts. Specifically, think-time delays can be set to be fixed, exponentially random, or to the actual timing from that of the recording. One or more embodiments run with low execution overhead, thus permitting many simulated clients to be run at the same time from a single machine. This is a significant advantage of one or more embodiments, as it permits realizing the goal of efficiently driving realistic client workloads without unwanted effects from the execution of the driver program itself.

Results of a desktop benchmarking tool run: There are two outputs of an exemplary tool that are of interest: automated execution of user desktop workloads resulting in loading the tested system, and the measurement of execution times for the desktop events of interest. For the latter, when an exemplary tool plays back artifacts, it captures precise timing for each of the groups of events represented by a synchronization point, and reports these for use in subsequent performance analysis.

Prototype Implementation

An experimental desktop benchmarking tool was implemented with the XLib library in the Linux OS and the "rdesktop" program was used as a test application. The "rdesktop" program is an open source client for Windows NT Terminal Server and Windows 2000/2003 Terminal Services, which is capable of natively speaking Remote Desktop Protocol (RDP) and currently runs on most UNIX based platforms using the X Windows System to present the client Windows desktop.

In case of the XLib library the following calls are responsible for the basic windowing operations that have to be modified and intercepted and/or injected:

XNextEvent( ) which is used by applications to process the windowing events such as keyboard, mouse, and window visibility notifications, etc.

XPutImage( ) that applications use to update a screen region

XCopyArea( ) used for retrieving data from the cache

However, as discussed in the prior section, one or more embodiments of the method have no inherent dependencies on any application specific constructs or metrics and can be applied to other operating systems and window managers too.

Performance Studies

In order to illustrate the flexibility and applicability of an exemplary desktop benchmarking tool to performance evaluation of virtual workstations, a series of experiments were conducted on a testbed. The artifacts used in the experiments represent a subset of actions of a personal computer user. However, they are not exhaustive and the results presented should not be treated as definitive capacity estimates for a given user class but rather as illustrations of applicability and flexibility of the exemplary benchmarking tool; i.e. the experimental results are exemplary and non-limiting.

The experiments are designed to test two aspects of desktop virtualization: (1) scalability of virtual machine hypervisors to the number of concurrent sessions and the intensity of workload applied, and (2) sensitivity of the virtual desktop to network latencies. The first aspect is significant for capacity planning of back-end hosting resources. Good understanding of actual responsiveness as perceived by the end-user is the key metric that needs to be used in deciding what levels of concurrency (number of desktop virtual machines per physical server) should be used. The second aspect, impact of network latency, allows reasoning about the distances between the server hosting the virtual machine and the end-user's device so as to not noticeably deteriorate the user's experience.

Experimental Setup

Figure 6:
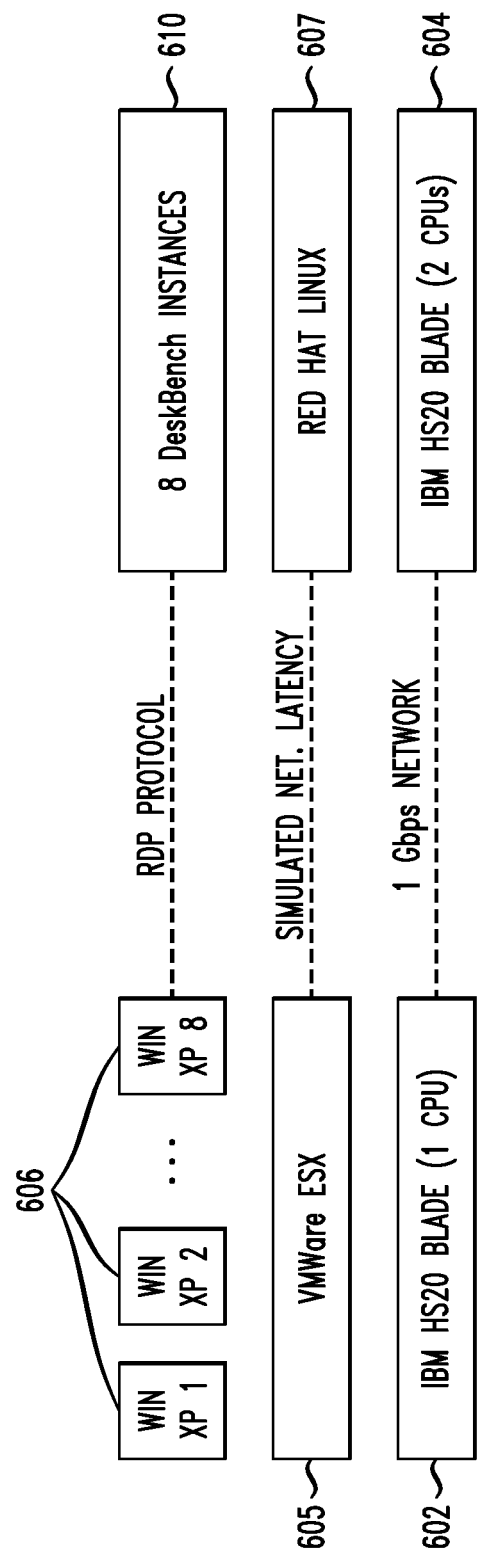
FIG. 6 shows an exemplary experimental test bed.
Figure 7B:
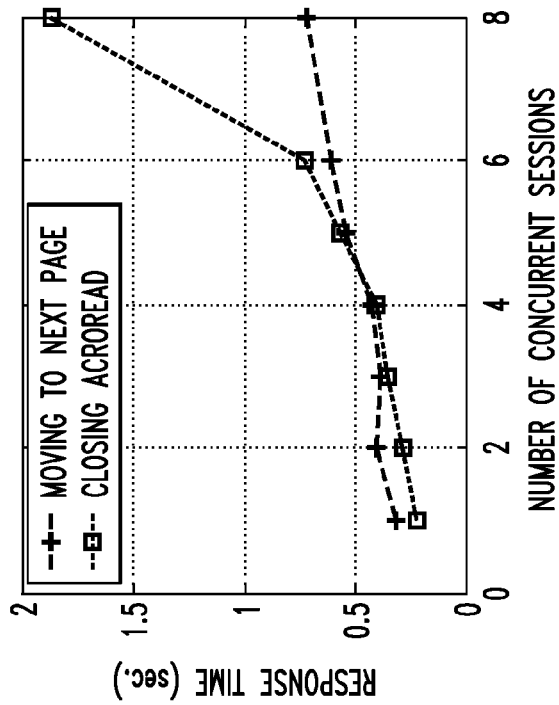
FIGS. 7A-7F depict exemplary responsiveness as a function of the number of virtual machines (VM) on a physical machine (PM), as noted in experiments.
Figure 7A:
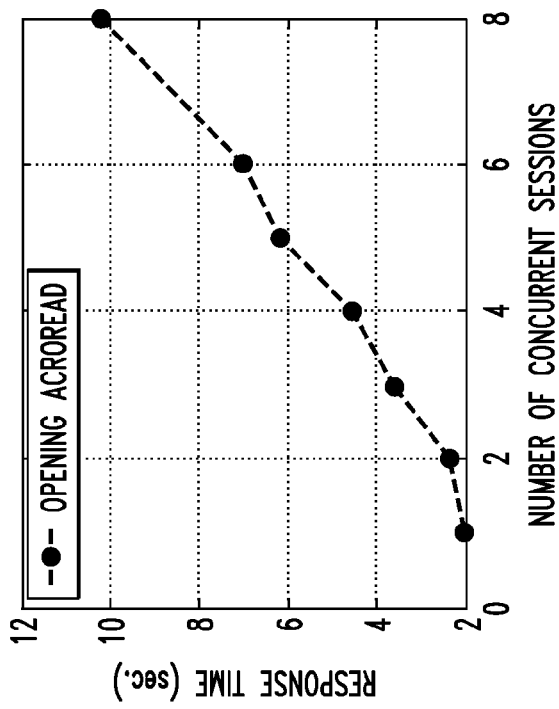
Figure 7D:
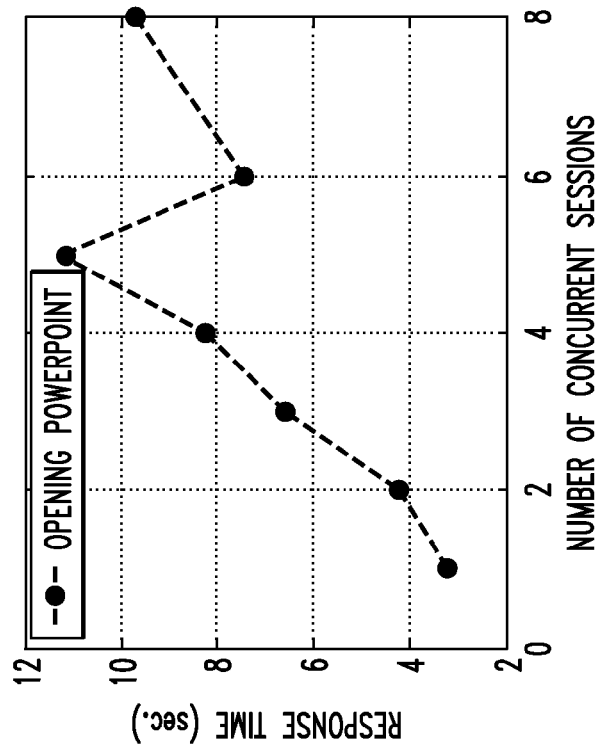
Figure 7C:
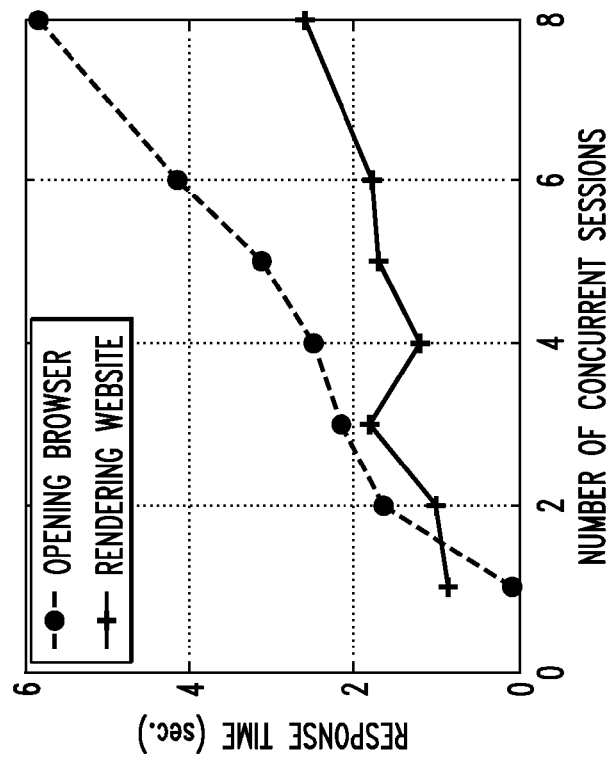
Figure 7F:
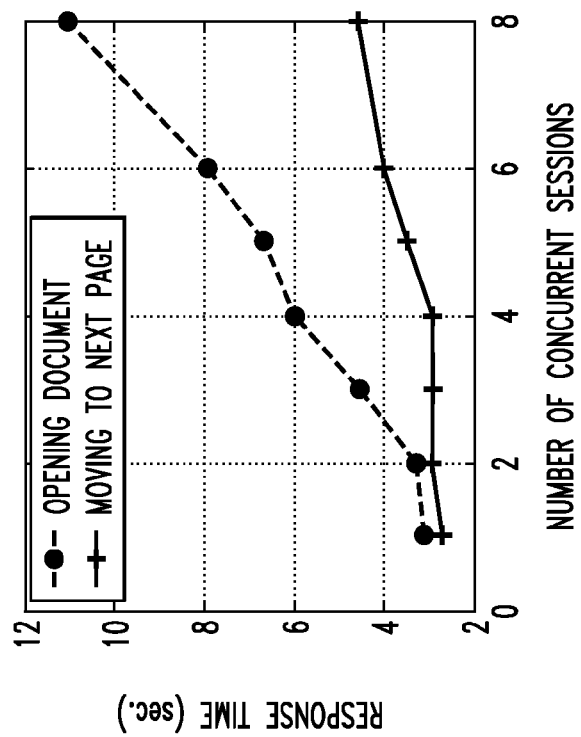
Figure 7E:
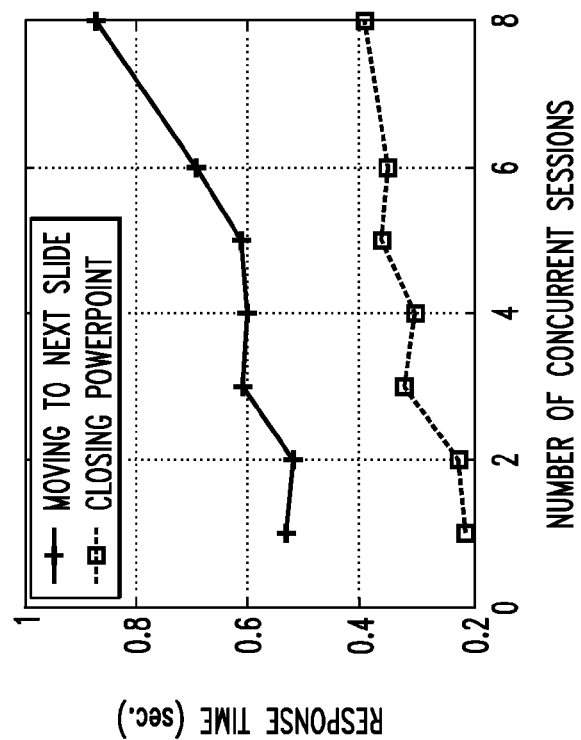

The setup is presented in FIG. 6. Two IBM HS20 Blades 602, 604 were employed. The first server 602 runs ESX Server (version 3.0.2) 605 hosting virtual machines 606 running the Microsoft Windows XP operating system. These virtual machines represent desktop workstations running within a virtualized desktop environment. This blade is equipped with 1 dual core Xeon CPU (3.2 GHZ dual core). The second blade server 604 runs Red Hat Enterprise Linux AS 3 607 and executes the exemplary desktop benchmarking program 610 (here, eight instances thereof). This blade has 2 Xeon CPUs (each 3.2 GHZ dual core). The blades are within the same blade center; thus, networking latency is practically zero, but for network latency experiments simulated delay was introduced using the Linux tc utility. The protocol used to access workstations from client programs was RDP v. 5.

Artifacts Used in the Experiments

In order to demonstrate flexibility and applicability of the exemplary desktop benchmarking tool, seven artifacts were created, representing a typical interaction of end-users with their desktops. The artifacts exercise multiple GUI functionalities as well as requiring the operating system to load files, and to utilize both the network and storage. The artifacts employed in the examples include:

Acrobat: Open an Adobe Acrobat document and browse the pages. Synchronization elements are after the opening, following each page change, and at the close of the application.

Folder: Open a folder within the local file system. Highlight and un-highlight files and directories. Change directories and quit the Microsoft Windows Explorer. The synchronization elements are after each action.

MS Word: Load a large document with text and graphics, browse the document and type a few words. Synchronization elements are located after each operation except scrolling pages down.

Picture: Open several pictures (with resolution 3200×2400) and zoom in on some of them. Synchronization is after opening each picture and following each of the application closing operations.

PowerPoint: Open a Microsoft PowerPoint presentation file and scroll through the pages. Synchronization elements are after opening the PowerPoint and after displaying each of the pages.

Web browser: Open a web browser and visit websites. Synchronization elements are after opening the application and then after loading each of the websites.

The "fuzzy" matching of screen images provides for extra flexibility when dealing with applications that are not fully deterministic or would require significant configuration effort to make them deterministic. An example might be a web browser artifact where the website that was visited changes a little bit with each visit, (e.g. contains a visit counter and the date of last visit). With the exact matching technique this website could not be benchmarked but the threshold based extensions handle this case well.

Discussion of the Experimental Results

Two groups of experiments, designed to quantify the quality of a user's desktop experience, were performed. The first group was focused on measuring the responsiveness of artifacts described above with increased contention for server resources. The second group focused on quantifying the impact of network latency (and thus RDP protocol slowdown) on the responsiveness of the artifacts.

Effects of the hypervisor contention: In each round of these experiments desktop benchmarking clients were run against the set of test virtual machines that are hosted on one HS20 Blade. The number of active sessions (i.e. virtual machines being driven) varied between 1 and 8. Each desktop session replayed the artifacts described above 20 times in random order to avoid synchronization effects. Within each replay the delay after reaching each synchronization point was 100 ms thus emulating tireless users. This is why this group of experiments is illustrative of the flexibility and accuracy of an embodiment of a desktop benchmarking tool, but not necessarily of realistic capacities. In realistic conditions the load intensity is significantly smaller due to greater user think-times than used in the experiments.

Representative results from the contention experiments are presented in FIG. 7. FIG. 7A shows the results for opening the Acrobat document. The time stretches from around 2 seconds with one concurrent session up to more than 10 seconds with 8 concurrent sessions, thus representing a fivefold slowdown. Similar results are shown for other applications in the benchmark and illustrate applicability of an exemplary embodiment of a desktop benchmarking tool. Having larger sample runs would eliminate the spikes seen in some of the graphs. These are included to illustrate the capabilities of the tool. FIG. 7B shows Acrobat operations, FIG. 7C shows Internet Explorer, FIGS. 7D and 7E show PowerPoint, and FIG. 7F shows a word processor, all as a function of number of VMs on a PM.

Figure 8B:
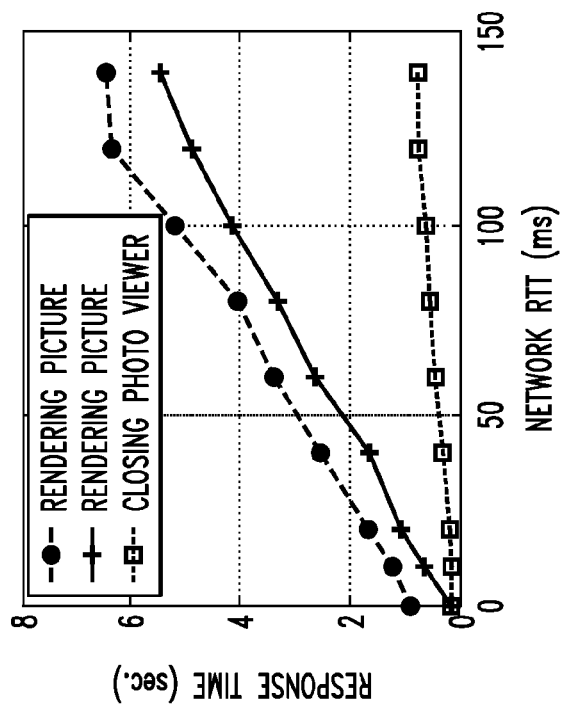
FIGS. 8A and 8B depict exemplary responsiveness as a function of network latency, as noted in experiments.
Figure 8A:
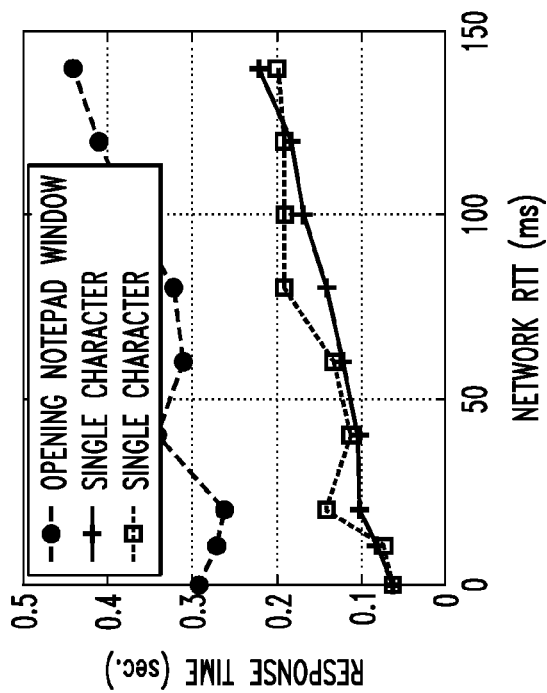

Effects of the network latency: The second group of experiments focused on quantifying the impact of network latency on the user's desktop experience. In order to study it in a controlled manner, simulated network delay was introduced using the tc tool that is part of modern Linux distributions. It allows for setting various queuing disciplines at the network interface level and also changing the key properties of the interface, such as transmission rate and added latency. In each experiment a single concurrent exemplary desktop benchmarking client was run against a test virtual machine (as shown in FIG. 6). The experimental results of varying values of network latency introduced in the network interface of the server that was running the exemplary desktop benchmarking program were compared. The values were sampled between 0 ms and 140 ms because they represent the realistic range observed in networking applications. The low latency can be achieved in local setups when the back-end server is on the same LAN as the hosted virtual machines (as was the case for the experimental setup). The high RTT values (in the order of 100 ms or more) are commonly observed when accessing computing systems located across the continent (stated with respect to the United States). The results of these experiments using the Notepad text editor and a picture rendering program are presented in FIGS. 8A and 8B, respectively. Time required to render and transmit the picture stretches almost 6 times representing a significant degradation in the user's experience. Similarly, keystroke response stretches approximately 3 times. Note that values for sample points with a 0 ms RTT correspond to the experiments with no slowdown in the Ethernet adapter on the Linux server. In this case the actual RTT was on the order of 0.6 ms.

Overhead of the benchmarking tool: While conducting the experiments, the utilization of the Linux server that was running the exemplary desktop benchmarking program was also measured. The per-session utilization of the server is about 2% which is almost identical to that of the unmodified native desktop client program on which the exemplary desktop benchmarking program prototype was based. In experiments with all 8 concurrent sessions the exemplary desktop benchmarking program Blade server runs at 84% idle (i.e. only 16% utilization) thus guaranteeing that the effect of any contention from driving parallel desktop clients has negligible effect on the benchmarking results. Of course experiments involving much larger numbers of client instances would require more servers running the exemplary desktop benchmarking program to drive the desktop client workloads.

Choice of the "fuzzy" matching thresholds: Experiments have been conducted with the choice of two parameters for deciding whether two screens match. The adaptivity of the system increases with larger value of the parameters but may lead to unsynchronized execution. It is not a big risk though, because even if the current incorrectness is not captured it will be revealed in one of the subsequent actions which will diverge significantly to exceed even relaxed threshold values. It was found in the experiments that the best values of the parameters are $T_{Expected}=0.01$ and $T_{unexpected}=0.001$. These values are large enough to avoid practically all "false" differences.

Miscellaneous Comments

One or more embodiments allow for more general artifacts (even covering the whole screen), as compared to the techniques of N. Zeldovich and R. Chandra, Interactive performance measurement with VNCPlay, in *Proceedings of FREENIX*, 2005. Furthermore, one or more embodiments provide for "fuzzy" matching making them more robust in adapting to desktops which are not fully deterministic. Even further, one or more embodiments are application- and protocol-indifferent because they can be implemented within the window manager library.

One or more embodiments thus provide a flexible virtual workstation benchmarking system which allows for rapid creation of artifacts representing user actions and replaying them in synchronized manner against a test system. A novel approach is employed to intercept and inject keyboard and mouse events and to monitor the screen updates in an application-indifferent manner. The artifacts can be replayed at maximum speed thus making it possible to not only measure the responsiveness of the system precisely but also generate high load on the server.

Recapitulation

Given the discussion thus far, it will be appreciated that, in general terms, an exemplary method, according to an aspect of the invention, includes the step of intercepting and recording, in an artifact file, with a benchmarking tool, a plurality of user interactions in a baseline computing system; for example, as described above with respect to blocks 208, 212 and 214 of FIG. 2. In one or more embodiments, the baseline computing system is a physical machine and the system under test is a virtual desktop. The user interactions could, but need not, be client-user interactions. The baseline computing system could instead be a baseline virtual desktop computing system, wherein a baseline client (e.g., similar to 102) interacts over a baseline network (e.g., similar to 108) with a baseline virtual desktop (e.g., similar to 106) running on a baseline remote server (e.g., similar to 104). An additional step includes replaying and injecting the recorded user interactions from the artifact file to a software stack (e.g., a window manager similar to 210, a keyboard and/or mouse driver, a screen driver, or the like) of a system under test (whose performance is to be compared to the baseline system), using the benchmarking tool (e.g., 208). During the replay, an additional step includes sequentially comparing screen updates in the system under test (e.g., note physical machine 602 running multiple virtual machines 606) with expected screen images from the artifact file, until a match is observed in a given case, as described with respect to FIG. 3. The screen updates could, but need not, be arriving from a server of the system under test. A further step includes recording a response time associated with each of the matches, as also described with respect to FIG. 3.

Note that the system in FIG. 1 was described as including "thin" clients, but one or more techniques, according to aspects of the invention, can be used to benchmark virtual desktops regardless of the nature of the clients, and the recitation of a virtual desktop computing system in the claims is not intended to limit clients of such system to so-called "thin" clients unless expressly stated. Indeed, clients 102 could more generally include many different types of devices capable of implementing remoting protocols, such as smart phones, laptop computers, and the like.

In some cases, in the intercepting step, the plurality of user interactions include keyboard and mouse events 214 generated by a software stack of the baseline computing system (e.g., window manager such as 210 or another alternative) and passed to an application such as 202.

In one or more embodiments, an additional step includes recording, in the artifact file, synchronization points entered by the user, as described above in the "recording phase" section.

In some cases, an additional step includes storing a hash code in association with each of the synchronization points, as described above in the "recording phase" section. The stored hash codes can include a hash of a screen image buffer, and the match in the comparing step can be based at least on the stored hash code (e.g., an exact and/or "fuzzy" match as described elsewhere herein).

In some instances, the comparing step includes initially checking for an exact match of the hash code of an actual screen buffer against a corresponding one of the stored hash codes; in case the initial comparison yields the exact match, recording the response time (e.g., $t_3$-$t_2$ in FIG. 3); in case the initial comparison does not yield the exact match, conducting a fuzzy comparison based on a first amount of pixel deviation allowed in an expected screen change region and a second amount of pixel deviation allowed in a remaining screen region; and in case the fuzzy comparison is acceptable, recording the response time(again, e.g., $t_3$-$t_2$ in FIG. 3). An example of this process is described above in connection with FIG. 3, Inequalities (1), and the sections on "replaying phase" and "'fuzzy' matching of screen states."

As noted elsewhere, the comparing step can be based on full screen representations; i.e., one or more embodiments allow for general artifacts (e.g., covering the whole screen).

In some cases, additional steps include measuring and recording user think times of the user in the artifact file; for example, as described above in the section on "recoding phase," and, in conjunction with recording the response times, delaying a next replay by a value associated with a corresponding one of the user think times. An example of this latter aspect is presented in connection with time $t_2$ in FIG. 3—the next replay $t_2$ is delayed by the simulated think time which is a value associated with a corresponding one of the user think times (in the example, measured from $t_1$ by the corresponding one of the user think times reduced by $t_1$-$t_0$).

The method steps can be tied to a particular machine in that the intercepting and recording step can be carried out by a desktop benchmarking module 208 executing on at least one hardware processor of the baseline computing system, in association with window manager software 210 of the baseline computing system (e.g., within the window manager software 210 or as an independent layer between library 210 and application 202 in a client of the baseline computing system). Furthermore, the replaying and injecting step, the comparing step, and the recording step can be carried out by the desktop benchmarking module 208 executing on at least one hardware processor of the system under test.

Figure 10:
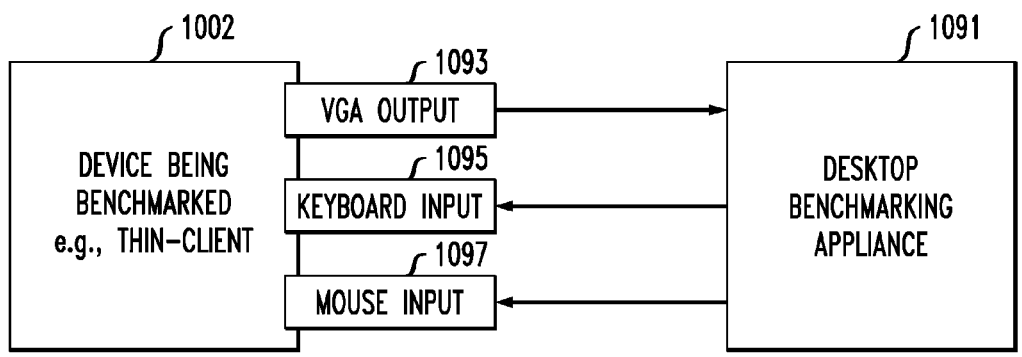
FIG. 10 shows architecture of an exemplary alternative embodiment of a system, according to a further aspect of the invention.

As shown in FIG. 10, in some instances, the desktop benchmarking module 208 may execute on a desktop benchmarking appliance 1091 coupled to a client 1002 of a system being benchmarked. Connections of client 1002 over a network to a remote server with a virtual desktop are omitted for brevity, but could be as depicted in the other figures. Ideally, desktop benchmarking module 208 runs on the client of the system under test; however, the approach in FIG. 10 is quite serviceable since the majority of measured latency comes not from the device but from the network; i.e., network latency is the dominating factor. In some cases, a test laptop may be plugged into the network connection where the client of the system to be benchmarked would normally be connected.

Still referring to FIG. 10, in the example depicted, appliance 1091 connects to VGA (or another standard graphics port) output 1093 of the thin-client (or other client) 1002 and also to keyboard and mouse inputs 1095, 1097. The VGA (or similar) signal is converted into bitmap representation and forwarded to the desktop benchmarking module on appliance 1091. Such module 208 runs within the appliance 1091, analyzes the screen state, and sends keyboard and mouse events to the thin-client (or other client).

Given the teachings herein, the skilled artisan will be able to implement one or more embodiments of the invention; for example, known techniques can be used to take a signal from a VGA cable or the like and convert same to a bit map.

Embodiments of the invention may include, for example, both the recording and replaying phases, as well as a replay phase based on an existing recorded baseline.

It should be noted that one or more non-limiting exemplary embodiments have been presented, wherein the baseline machine and machine under test both have a virtual desktop architecture. However, the baseline machine being benchmarked does not necessarily have a virtual desktop architecture; for example, the experimental point of reference herein was not a virtual machine architecture. Using one or more embodiments of the invention, it is possible to baseline an existing laptop or desktop which is a physical machine and then compare that with how that desktop runs on a virtual desktop (VM, running possibly remotely). Indeed, in general terms, in one or more embodiments of the invention, either the baseline or the case to compare with, can be either a physical or virtual machine. It is possible to benchmark two physical machines (with one as baseline) or two VMs, or mixed as described above, for planning transformation from physical to virtual desktops.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 9:
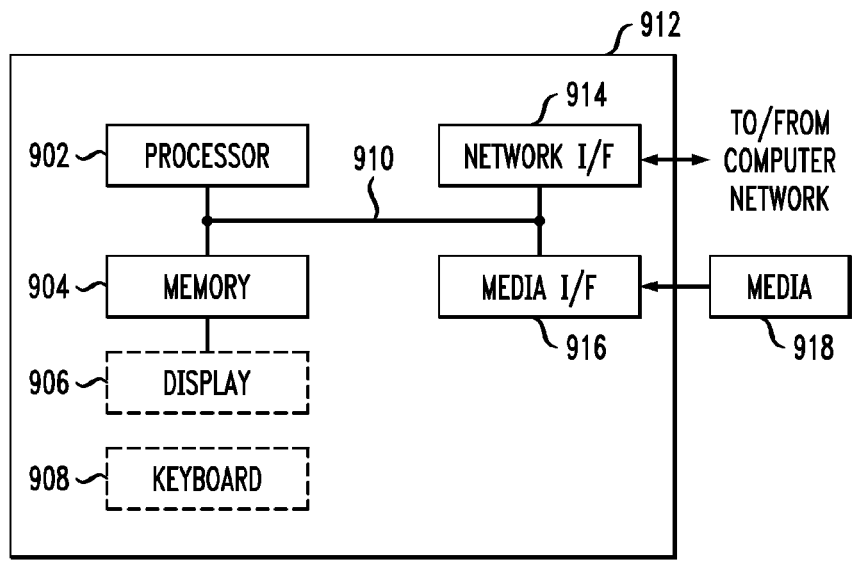
FIG. 9 depicts a computer system that may be useful in implementing one or more aspects and/or elements of the invention.

One or more embodiments can make use of software running on a general purpose computer or workstation. With reference to FIG. 9, such an implementation might employ, for example, a processor 902, a memory 904, and an input/output interface formed, for example, by a display 906 and a keyboard 908. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 902, memory 904, and input/output interface such as display 906 and keyboard 908 can be interconnected, for example, via bus 910 as part of a data processing unit 912. Suitable interconnections, for example via bus 910, can also be provided to a network interface 914, such as a network card, which can be provided to interface with a computer network, and to a media interface 916, such as a diskette or CD-ROM drive, which can be provided to interface with media 918.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 902 coupled directly or indirectly to memory elements 904 through a system bus 910. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 908, displays 906, pointing devices, and the like) can be coupled to the system either directly (such as via bus 910) or through intervening I/O controllers (omitted for clarity).

Network adapters such as network interface 914 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 912 as shown in FIG. 9) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 918 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In particular, benchmarking software may execute on a client interacting with a server over a network in a virtual desktop model, and/or on a desktop benchmarking appliance coupled to such a client.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams of FIGS. 2 and 6; by way of example and not limitation, a desktop benchmarking module. The method steps can then be carried out using the distinct software module(s) and/or sub-modules of the system, as described above, executing on one or more hardware processors 902. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    intercepting and recording, in an artifact file, with a benchmarking tool, a plurality of user interactions in a baseline computing system;
    replaying and injecting said recorded user interactions from said artifact file to a software stack of a system under test, using said benchmarking tool;
    during said replay, sequentially comparing screen updates in said system under test with expected screen images from said artifact file, until a match is observed in a given case; and
    recording a response time associated with each of said matches; and
    recording, in said artifact file, synchronization points entered by said user, wherein a synchronization point represents at least one of a screen state that is an end to a set of events or a point that said user marks for measured execution time, and the method is performed by a computer system comprising a memory and at least one processor coupled to the memory.

2. The method of claim 1, wherein, in said intercepting step, said plurality of user interactions comprise keyboard and mouse events generated by a software stack of said baseline computing system and passed to an application.

3. The method of claim 1, further comprising storing a hash code in association with each of said synchronization points, said stored hash codes comprising a hash of a screen image buffer, wherein said match in said comparing step is based at least on said stored hash code.

4. The method of claim 3, wherein said comparing comprises:
   initially checking for an exact match of a hash code of an actual screen buffer against a corresponding one of said stored hash codes;
   in case said initial comparison yields said exact match, recording said response time;
   in case said initial comparison does not yield said exact match, conducting a fuzzy comparison based on a first amount of pixel deviation allowed in an expected screen change region and a second amount of pixel deviation allowed in a remaining screen region; and
   in case said fuzzy comparison is acceptable, recording said response time.

5. The method of claim 4, wherein said comparing is based on full screen representations.

6. The method of claim 3, further comprising:
   measuring and recording user think times of said user in said artifact file; and
   in conjunction with recording said response times, delaying a next replay by a value associated with a corresponding one of said user think times.

7. The method of claim 1, wherein, in said replaying and injecting step, said software stack of said system under test comprises a window manager.

8. The method of claim 1, wherein, in said comparing step, said screen updates arrive from a server of said system under test.

9. The method of claim 1, wherein, in said intercepting step and recording steps, said baseline computing system comprises a baseline virtual desktop computing system wherein a baseline client interacts over a baseline network with a baseline virtual desktop running on a baseline remote server.

10. The method of claim 1, further comprising providing a system,
   wherein said system comprises at least one distinct software module embodied on a computer-readable storage medium, and wherein said at least one distinct software module comprises a desktop benchmarking module;
   wherein:
   said intercepting step and recording steps are carried out by said desktop benchmarking module executing on at least one hardware processor of said baseline computing system, in association with a software stack of said baseline computing system;
   said replaying and injecting step, said comparing step, and said recording steps are carried out by said desktop benchmarking module executing on at least one hardware processor of said system under test.

11. The method of claim 1, further comprising providing a system, wherein said system Comprises at least one distinct software module embodied on a computer-readable storage medium, and wherein said at least one distinct software module comprises a desktop benchmarking module; wherein:
   said intercepting step and recording steps are carried out by said desktop benchmarking module executing on at least one hardware processor of said baseline computing system, in association with a software stack of said baseline computing system;
   said replaying and injecting step, said comparing step, and said recording steps are carried out by said desktop benchmarking module executing on at least one hardware processor of a desktop benchmarking appliance coupled to a client of said system under test.

12. A computer program product comprising a computer readable storage memory having computer readable program code embodied therewith, said computer readable program code comprising:
   computer readable program code configured to intercept and record, in an artifact file with a benchmarking tool, a plurality of user actions in a baseline computing system, wherein the benchmarking tool provides capability for recording and replaying of user's activity;
   computer readable program code configured to replay and inject said recorded user inter actions from said artifact file to a software stack of a system under test;
   computer readable program code configured to, during said replay, sequentially compare screen updates in said system under test with expected screen images from said artifact file, until a match is observed in a given case; and
   computer readable program code configured to record a response time associated with each of said matches; and
   computer readable program code configured to record, in said artifact file, synchronization points entered by said user, wherein a synchronization point represents at least one of a screen state that is an end to a set of events or a point that said user marks for measured execution time.

13. The computer program product of claim 12, wherein, in said computer readable program code configured to intercept and record, said plurality of user interactions comprise keyboard and mouse events generated by a software stack of said baseline computing system and passed to an application.

14. The computer program product of claim 12, further comprising computer readable program code configured to store a hash code in association with each of said synchronization points, said stored hash codes comprising a hash of a screen image buffer, wherein said match in said computer readable program code configured to compare is based at least on said stored hash code.

15. The computer program product of claim 14, wherein said computer readable program code configured to compare comprises:
   computer readable program code configured to initially check for an exact match of a hash code of an actual screen buffer against a corresponding one of said stored hash codes;
   computer readable program code configured to, in case said initial comparison yields said exact match, record said response time;
   computer readable program code configured to, in case said initial comparison does not yield said exact match, conduct a fuzzy comparison based on a first amount of pixel deviation allowed in an expected screen change region and a second amount of pixel deviation allowed in a remaining screen region; and
   computer readable program code configured to, in case said fuzzy comparison is acceptable, record said response time.

16. The computer program product of claim 15, wherein, in said computer readable program code configured to compare, said comparing is based on full screen representations.

17. The computer program product of claim 14, further comprising:
   computer readable program code configured to measure and record user think times of said user in said artifact file; and computer readable program code configured to, in conjunction with recording said response times, delay a next replay by a value associated with a corresponding one of said user think times.

18. An apparatus comprising:
a memory; and at least one processor, coupled to said memory, and operative to:
replay and inject recorded user interactions from an artifact file to a software stack of a system under test with a benchmarking tool, said recorded user interactions having been intercepted and recorded, in said artifact file, in a baseline computing system, wherein the benchmarking tool provides capability for recording and replaying of user's activity;
during said replay, sequentially compare screen updates in said system under test with expected screen images from said artifact file, until a match is observed in a given case;
record a response time associated with each of said matches; and
record, in said artifact tile, synchronization points entered by said user, wherein a synchronization point represents at least one of a screen state that is an end to a set of events or a point that said user marks for measured execution time.

19. The apparatus of claim 18, wherein said plurality of recorded user interactions comprise keyboard and mouse events generated by a software stack of said baseline computing system and passed to an application.

20. The apparatus of claim 19, wherein said artifact file further comprises:
a hash code stored in association with each of said synchronization points, said stored hash codes comprising a hash of a screen image buffer, wherein said match in said comparing is based at least on said stored hash code.

21. The apparatus of claim 20, wherein said at least one processor is operative to compare by:
initially checking for an exact match of a hash code of an actual screen buffer against a corresponding one of said stored hash codes;
in case said initial comparison yields said exact match, recording said response time;
in case said initial comparison does not yield said exact match, conducting a fuzzy comparison based on a first amount of pixel deviation allowed in an expected screen change region and a second amount of pixel deviation allowed in a remaining screen region; and
in case said fuzzy comparison is acceptable, recording said response time; and
wherein said at least one processor is operative to compare based on full screen representations.

22. The apparatus of claim 18, further comprising a desktop benchmarking module embodied on a computer-readable storage medium, wherein said at least one processor is operative to carry out said replaying and injecting, said comparing, and said recording by executing said desktop benchmarking module.

23. An apparatus having a processor and comprising:
means for intercepting and recording, in an artifact file, with a benchmarking tool, a plurality of user interactions in a baseline computing system, wherein the benchmarking tool provides capability for recording and replaying of user's activity;
means for replaying and injecting said recorded user interactions from said artifact file to a software stack of a system under test, using said benchmarking tool;
means for, during said replay, sequentially comparing screen updates in said system under test with expected screen images from said artifact file, until a match is observed in a given case; means for recording a response time associated with each of said matches; and
means for recording, in said artifact file, synchronization points entered by said user, wherein a synchronization point represents at least one of a screen state that is an end to a set of events or a point that said user marks for measured execution time.

* * * * *